UNITED STATES PATENT OFFICE.

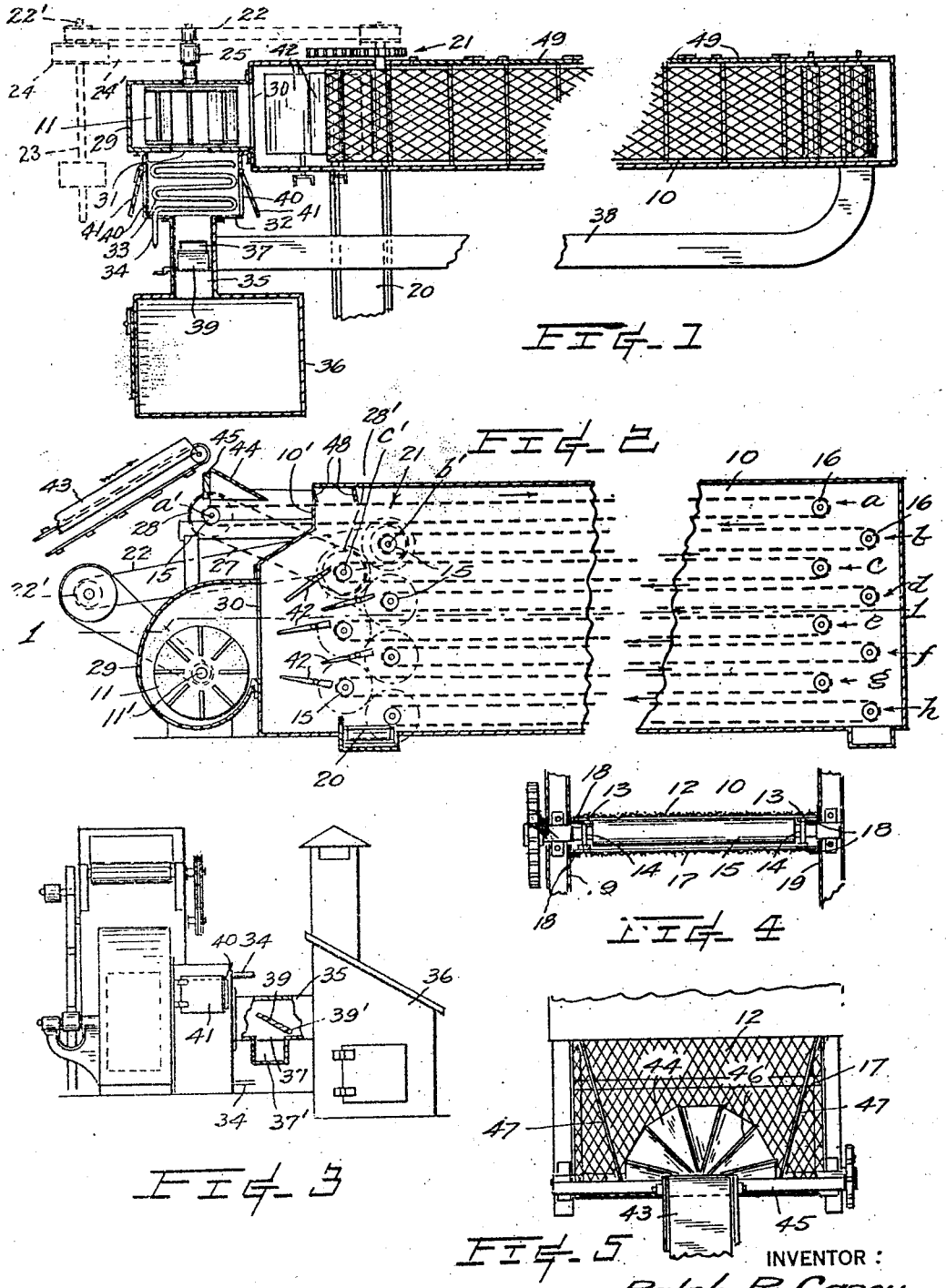

RALPH R. CASEY, OF SEATTLE, WASHINGTON.

FOOD CURING AND SMOKING APPARATUS.

1,337,974.  Specification of Letters Patent.  Patented Apr. 20, 1920.

Application filed October 8, 1919. Serial No. 329,181.

*To all whom it may concern:*

Be it known that I, RALPH R. CASEY, a citizen of the United States, residing at Seattle, in the county of King and State of Washington, have invented certain new and useful Improvements in Food Curing and Smoking Apparatus, of which the following is a specification.

This invention relates to apparatus for drying and smoking comestibles such, for example, as herring.

The object of the invention is the provision of inexpensively operated apparatus whereby fish, or other articles of food, may be dried or smoked in a most efficient manner.

The invention consists in the novel construction, arrangement and combination of devices as will be hereinafter described and claimed.

In the accompanying drawings, Figure 1 is a horizontal sectional view of apparatus embodying my invention, said section being taken through 1—1 of Fig. 2. Fig. 2 is a longitudinal vertical section, shown somewhat diagrammatically. Fig. 3 is an end elevation of the same. Fig. 4 is a transverse detail sectional view through the smoke chamber, showing the preferred construction of a conveyer driving roller and associated parts. Fig. 5 is a fragmentary plan view of the front end of the apparatus to illustrate, more especially, the feeding devices.

The reference numeral 10 designates a chamber wherein the drying and smoking of articles, hereinafter referred to as "fish," through the medium of air and smoke or by an admixture of both which is supplied into the front end of the chamber from a rotary fan or blower 11.

Within said chamber is provided a series of superposed conveyers designated by $a$, $b$, $c$—$h$ which are arranged so that the alternate ones, as $a$, $c$, etc., will project a distance in front of the remaining ones $b$, $d$, etc., which, in turn, project beyond the rear of the first named conveyers.

These conveyers are each made of an endless belt which, as shown in the detail view Fig. 4, is preferably formed of a wire fabric web 12, having connected adjacent to its opposite sides sprocket chains 13 passing about sprocket wheels 14 provided at opposite ends of the live roller 15 about which a belt travels at the front end of the chamber. 16 represents idler rollers provided adjacent to the rear end of the chamber, for the respective belts. The belt fabrics are furthermore supported intermediate the rollers therefor by transversely arranged slats, such as 17, Fig. 4, attached to the fabrics and tracking upon rails 18 secured to the side walls 19 of the chamber.

As indicated by arrows in Fig. 2, said conveyers are driven in opposite directions so that the fish when placed upon the conveyer $a$, after traveling rearwardly therewith, will drop onto the conveyer $b$ to be carried forwardly thereby to drop onto the conveyer $c$, and so on, traveling back and forth upon the successive conveyers to finally drop from the lowest one $h$ into a transverse discharge conveyer 20. The conveyers $b$, $c$, $d$—$h$ are driven by a train of gears, indicated generally by 21, the primary shaft $b^1$ of said train of gears is driven by a belt 22 from a pulley $22^1$ on a power shaft 23 which also serves, through a pulley 24 and a belt $24^1$, to drive a pulley 25 upon the arbor $11^1$ of the blower 11 to rotate the same.

The conveyer $a$ which extends through openings provided therefor in the front wall $10^1$ of said chamber is preferably driven from roller shaft $c^1$, by means of a sprocket chain, indicated by 27, passing about wheels 28 and $28^1$ mounted on the shafts $a^1$ and $c^1$ of the respective conveyer rollers.

Said blower fan is inclosed in a casing 29 having an outlet 30 into the front end of chamber 10 and an inlet passage 31, Fig. 1, leading from a casing 32. Within the latter are radiators or coils 33 which are heated through the medium of steam supplied by a pipe 34 from a boiler, not shown. At its end remote from the blower connection 31, the casing 32 is connected by a duct 35 with a smoke generator 36. The duct 35 is also connected through a passage 37, Fig. 3, with the outlet end $37^1$ of a return smoke flue 38 extending from the rear end of chamber 10. 39 represents a valve provided in the duct 35 and is pivoted at $39^1$ between the generator and the passage 37 so as to be used upon occasion to close, more or less, the communication between the heater casing 32 and the return smoke flue 38 or the smoke generator 36 selectively. 40 represents openings provided at opposite sides of the casing 32 for the admission of air into the latter from the external atmosphere, said openings being located adjacent to the top of the casing and are provided with doors 41 to regulate the effective sizes of such openings.

42 represents blades provided within the chamber 10 between the passage 30 from the fan casing and the adjacent ends of the conveyers, said blades being pivotally supported and adjustably movable about their respective axes so as to direct the flow of smoke and air from the fan to selected ones of the conveyers.

An elevator 43 extends over the forward end of the conveyer $a$ and serves to feed fish thereto. The fish, however, instead of being deposited directly from the elevator upon the uppermost conveyer is delivered upon an apron 44 which serves to distribute the fish in a substantially even manner over subjacent portion of the referred to conveyer.

Said apron or distributer, as shown in Figs. 2 and 5, comprises a plate formed of semi-conoidal shape secured to a support 45 below the delivery end of the elevator and having upwardly protruding rib elements 46, Fig. 5, extending from the apex radially to the periphery of the apron.

47 represents guide bars which prevent the fish falling from the upper conveyer at the sides of the apron 44.

Where the conveyer passes into the smoke chamber I provide doors or curtains 48 hung from their top edges and opening inwardly of the chamber to allow the fish passing unobstructedly thereinto and preventing any substantial loss of the smoke. At one side of the chamber 10 are provided doors 49 to afford access into the chamber for inspecting the fish to observe the action of the smoke and air so that the relative volumes thereof may be regulated when deemed necessary.

When the apparatus is in use the fish are delivered from the elevator 43 upon the apron 44 to be thereby distributed over the adjacent end of the conveyer $a$. The fish are carried thereby into the smoke chamber 10 to be dropped upon the rear end of the second conveyer $b$ to be carried thereon to the forward end of the chamber whereat they are deposited upon the third conveyer $c$ and so on successively the fish are carried back and forth until deposited from the lowest conveyer $h$ into the discharge conveyer 20.

In their travel in the chamber the fish are exposed to the gases, smoke and air, to any required extent.

The smoke produced in the generator 36 is drawn by fan 11 through the duct 35 and heater 32 to be discharged into the front end of the chamber 10 through which it progressively travels and is withdrawn from the remote end of the chamber through return pipe 38 to mix with a further supply of smoke, if required, in the duct 35.

The smoke in such circulatory travel is accompanied, however, by a suitable quantity of atmospheric air which is admitted through inlet openings 40 at opposite sides of the heater in which it is preheated by the action of the radiators 33.

By adjustably moving the valve 39 the proportional amounts of newly made smoke from the generator 36 and the smoke-and-air mixture returning from the rear end of the smoke chamber may be regulated. This valve 39 regulates also the travel of the mixture through the chamber 10 by closing, more or less, the passage 37—according as to whether it is desired that the fish are to be subjected to pressure to cause the smoke to be forced into the fish.

In practice, it is most advantageous to have the fish when traveling upon the upper conveyers dried by gases containing a relatively small proportion of smoke and be exposed while upon the lower conveyers to a mixture in which smoke predominates. This is accomplished in the present invention by positioning the air inlets 40 above the plane of the axis of the fan 11 so that the air if admitted in sufficient quantities is impelled by the fan into the smoke chamber in strata whereof the upper portion is practically free from smoke.

The function of the blades 42 is two-fold, first in directing the courses of the gases to selected conveyers and secondly to act as baffles whereby the mixture of air and smoke may be regulated.

The operation of the invention will, it is thought, be understood from the foregoing description.

What I claim, is—

1. In apparatus of the character described a smoke chamber, a source of smoke, connection between the latter and the front end of said chamber, a power driven fan provided in said connection, a conduit between the rear end of the chamber and said connection, and a valve adapted to be used selectively for closing said conduit or the connection with respect to the source of smoke.

2. In apparatus of the character described, a smoke supply conduit, a power driven fan interposed between said conduit and the front end of said chamber, a return pipe extending from rear end of the chamber to said supply conduit, a valve adapted to be used to regulate the flow of smoke through said conduit and the return pipe selectively, and means to supply atmospheric air to the upper portion of said fan.

3. Apparatus of the character described comprising a smoke chamber, means to supply smoke and air into one end of the chamber and withdraw the same from the other end of the chamber, a series of superposed conveyers provided within the chamber, the upper of said conveyers extending exteriorly of the chamber, means to drive said conveyers alternately in opposite directions, a distributer and an elevator and an elevator for supplying comestible articles through the medium of said distributer upon the outer end of the upper of said conveyers.

4. In apparatus of the character described, a smoke chamber, and means to successively supply and withdraw food curing gases into and from the chamber, a series of superposed conveyers within the chamber, and means for directing currents of said gases with respect to selected series of conveyers.

5. In apparatus of the character described, a smoke chamber, conveyers provided therein in vertically spaced relations, a smoke generator, a smoke and air duct affording communication between said generator and said chamber, a power driven fan for effecting the flow of smoke and air through said duct into the smoke chamber, and a heater included in said duct and provided with controlled air inlets disposed at an elevation above the plane of the fan axis.

Signed at Seattle, Wash., this 30th day of September, 1919.

RALPH R. CASEY.

Witness:
   PIERRE BARNES.